United States Patent [19]

Wittkopf

[11] 4,305,507

[45] Dec. 15, 1981

[54] DISPOSABLE DIAPER RECLAIMING APPARATUS

[75] Inventor: Eugene W. Wittkopf, Suamico, Wis.

[73] Assignee: Magna-Graphics Corporation, Oconto Falls, Wis.

[21] Appl. No.: 178,562

[22] Filed: Aug. 15, 1980

[51] Int. Cl.³ .............................................. B07B 9/00
[52] U.S. Cl. ...................................... 209/3; 209/250; 209/308; 162/4; 162/55
[58] Field of Search .............................. 209/3, 21–23, 209/26–29, 250, 307, 308, 380, 45, 46; 162/4, 55

[56] References Cited

U.S. PATENT DOCUMENTS

| | | | |
|---|---|---|---|
| 1,026,432 | 5/1912 | Dey | 209/250 |
| 2,721,656 | 10/1955 | Goodwin | 209/308 X |
| 2,996,183 | 8/1961 | Russum | 209/28 |
| 3,890,220 | 6/1975 | Anderson | 209/3 |
| 3,909,397 | 9/1975 | Aldinger | 209/3 |

FOREIGN PATENT DOCUMENTS

| | | | |
|---|---|---|---|
| 629524 | 10/1961 | Canada | 209/307 |
| 554251 | 6/1923 | France | 209/28 |
| 975557 | 3/1951 | France | 209/45 |

Primary Examiner—Ralph J. Hill
Attorney, Agent, or Firm—James E. Nilles; James R. Custin

[57] ABSTRACT

Defectively made absorbent articles (e.g., disposable diapers) are shredded for reclamation, and their fluff fillers, mixed with undesired scraps, are fed downwardly towards a forwardly moving horizontal stretch of a conveyor screen. Fluff fibres are forced into a collecting chamber under said screen stretch by maintaining a subatmospheric pressure therein to generate a downward air flow through the screen. Above the stretch are a succession of separating chambers. Under the screen stretch, near the front of each such chamber, is an air outlet from which air is blown upward to lift material off of the screen. Near the front of each chamber, above the screen, is a paddle wheel rotor that propels lifted material rearwardly in the chamber, thus maintaining agitated circulation of material in each separating chamber. When one separating chamber is overloaded, excess material is carried on the screen into the next forward one.

14 Claims, 3 Drawing Figures

DISPOSABLE DIAPER RECLAIMING APPARATUS

FIELD OF THE INVENTION

This invention relates to apparatus for reclaiming the valuable material in defectively manufactured disposable diapers and similar articles; and the invention is more particularly concerned with apparatus for separating fluffy fibrous material such as constitutes the absorbent filler in disposable diapers from undesired material such as scraps of plastic sheet that has comprised the covering for such diapers, to enable the fluffy material to be recovered.

BACKGROUND OF THE INVENTION

A disposable absorbent article such as a disposable diaper, bed pad or sanitary napkin comprises an absorbent mat or pad of fluffy, fibrous cellulosic material, enwrapped in wet-strength sheet material through which moisture can pass into the fluffy pad. In the production of all such articles, manufacturing defects occur from time to time that require the scrapping of a certain amount of the product. Because of the complexities of the particular process by which disposable diapers are manufactured, the defect rate tends to be rather high for that product, requiring discard, on average, of about six percent of total production. Although lower, the defect rate for other disposable absorbent products is nevertheless high enough to be economically significant.

The most valuable component of any disposable absorbent product is the fluffy cellulosic material that constitutes its absorbent filler, which costs about $400 per ton to manufacture. Because of the high rate of rejection of disposable diapers and the large amount of fluffy filler contained in each diaper, the recovery of fluff from defectively made diapers is of particular interest from an economic standpoint. From the technological standpoint, the recovery of disposable diaper fluff is somewhat more difficult than recovery of fluff from other disposable absorbent products, and therefore technology that is satisfactory for reclaiming diaper fluff will assuredly be satisfactory for reclaiming fluff from other products. Accordingly, the following discussion will be directed particularly to the recovery of fluff from disposable diapers, not by way of limitation but, on the contrary, by way of an especially significant example.

In the manufacture of disposable diapers, the fluff is caused to adhere to one surface of the sheet that enwraps the filler by means of narrow strips of adhesive coated onto the sheet material. The fluff in a rejected diaper is accessible if the diaper is shredded by means of known machinery, but the fluff that comes out of the shredder is mixed with scraps of plastic, including waterproof backing material, absorbent wet-strength sheet material, elastic strips used in the diaper leg bands, and pieces of the plastic that formed the tie bands. All of these scraps are substantially larger than the individual fluff elements which are very slender fibres about ⅛ inch long.

Heretofore, there has been no technology for separating the fluff from the scraps, and the best that could be done in the interests of conversation was to recycle a small portion of the mixture of fluff and scraps back into the manufacturing process, to be mixed with virgin fluff for the manufacture of new diapers. Obviously the scraps in the mixture comprising the recycled material degraded the entire batch of mixed material, and therefore the amount of recycled material that was used had to be severely limited to avoid reducing diaper quality to an unacceptable level. Accordingly, the greater proportion of the material constituting rejected diapers was simply dumped for land fill.

Such discard of an economically valuable product involves a considerable loss of profits; but it is also regrettable as a loss of valuable forest product, inasmuch as wood is the raw material from which the fluff is produced.

It is evident that any apparatus or process for reclaiming the usable components of defectively manufactured disposable diapers and the like should be relatively inexpensive, since there is no economic gain in recovering the fluffy material unless the total cost of reclamation is no greater than the cost of producing an equivalent amount of new material. As items of reclamation cost, consideration must be given to the amount of capital tied up in the equipment needed for recovery, the cost of the space occupied by such equipment, the costs of labor and energy for operating the equipment, and the percentage of useful material that can be recovered.

It is clear, therefore, that apparatus for the reclamation of disposable diaper filler should be inexpensive and compact, should operate with low energy consumption, and should be as nearly as possible completely automatic. Furthermore, such apparatus should be capable of recovering the highest possible percentage of the desirable material, and the recovered material should be substantially completely free from undesired material.

The problem has existed for a substantially long time, and it has perhaps been obvious during that time that the constituents of shredded disposable diapers could be separated by sifting, inasmuch as the fibre elements of the useful fluff, which are fairly uniform in their dimensions, are much smaller than the scraps of undesired material. What has not been obvious was how an economically worthwhile portion of the fluff could be recovered with an application of the sifting principle. The mixed materials cannot be poured through a sieve or a screen, like sand, because the fluff is so light and clingy that it can be deflected by the lightest breeze and little or none of it will fall of its own weight through the interstices of a screen of suitable mesh. If the mixed materials are entrained in a fast moving air stream that flows through a screen, a little fluff will be pulled through the screen by the air stream, but a substantial amount of the fluff resists passage through the screen because it is entrapped in wads or clumps of scraps that are more or less entangled and tend to adhere to one another and the fluff. Such clumps and wads cannot be broken up by agitation of the screen because the material—especially the fluff—is too light to have any appreciable inertia.

Thus, the separation of fluff from scraps has heretofore been viewed as presenting a technological dilemma. On the one hand, the mixed materials must apparently be subjected to an air stream that flows more or less steadily downwardly through the separating screen, to force the fluff through that screen. On the other hand, such a downward air flow causes the wads and clumps of mixed materials to be confined against the screen and immobilized relative to it, so that such accumulations are not broken up to free the fluff from the entrapping scraps of undesired material. It may have been evident that a turbulent air flow could be employed to tumble and agitate the wads and clumps and thus break them up, but it was not evident how such turbulence could be generated without interfering with the needed downward air flow and without producing upward air flows through the screen that would carry some of the separated fluff back up into the mixed materials.

SUMMARY OF THE INVENTION

In one sense, the object of the present invention is to satisfy the above described paradoxical requirements by providing apparatus for sifting undesired coarser materials out of desired fluff to be reclaimed, wherein mixed materials are carried in a steady downflow of air that moves through a separating chamber and through a separating screen to which that chamber opens downwardly, to thus force fluff through the screen, and wherein a concurrent steady upflow of air is produced in the same chamber, to cause materials which have settled onto the screen to be lifted and carried back into said downflow for further separation of desired materials from undesired materials.

Thus the general object of the invention is to provide a low cost, practical and energy efficient apparatus for separating the valuable fluffy material of defectively manufactured absorbent articles from the undesired material with which such desired material is mixed when the articles are torn apart or fiberized, and whereby a substantially high percentage of the desired fluffy material can be recovered.

It is also an object of the invention to provide apparatus of the character described that is arranged for efficient continuous processing.

Another object of the invention is to provide apparatus of the character described that comprises a forwardly moving, substantially horizontal stretch of screen towards which mixed fluff and undesired material is fed downwardly, means for producing a generally downward air flow through the screen by which free fluff is forced down through it, and means for lifting, turning and agitating wads of mixed fluff and scraps that have settled onto the screen to break them up and for carrying such wads rearwardly over the screen and permitting them to be brought back down to the screen for passage of the free fluff through the screen.

Another object of this invention is to provide a method and apparatus of the character described that is capable of separating fibrous cellulosic fluff not only from scraps of other material but also from the clot-like nits or fisheyes which are usually present in virgin fluff, so that fluff reclaimed from rejected diapers and the like by the method and apparatus of this invention is actually of better quality than virgin fluff, and the invention offers an inexpensive method and means for treating virgin fluff to improve its quality.

Brief Description of the Drawings

In the accompanying drawings, which illustrate what is now regarded as a preferred embodiment of the invention.

Figure 1:
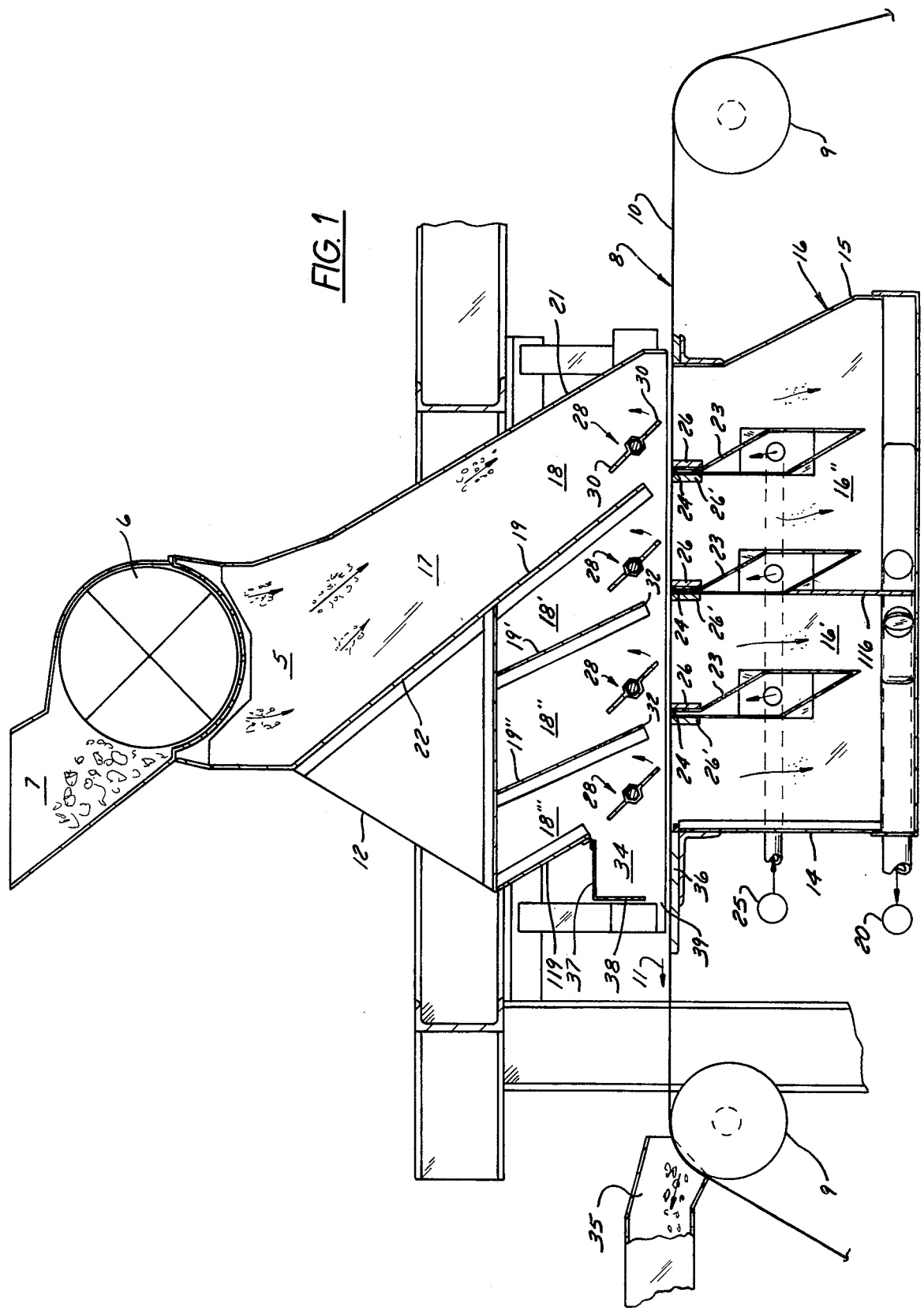
FIG. 1 is a view in vertical section through disposable diaper reclaiming apparatus embodying the principles of this invention.

Detailed Description of Preferred Embodiment of Invention

A separator machine embodying the principles of this invention has an inlet 5 that is communicated directly or indirectly with a source of rejected disposable diapers or similar articles that have been shredded for reclamation of their fluff content. As here shown, a generally conventional shredder or fiberizer 6, located directly above said inlet 5 and fed from a receiving hopper 7, operates in a known manner to reduce such articles to scraps of sheet and band material and variously sized clumps of fluffy fibrous material, all of which the shredder discharges into the inlet 5.

The fluffy material, which is suitable for re-use, is herein designated the desired material; the scraps, which have no value, constitute undesired material that is eventually discarded.

Separating of the desired material from the undesired material is accomplished by means of an endless screen conveyor 8 of the type used in the paper making art as a fourdrinier wire. Rollers 9 around which the screen is trained define one horizontal stretch 10 of it that is spaced below the inlet 5, and they drive the screen for movement of that stretch in a forward direction designated by the arrow 11. Mixed desired and undesired material entering the inlet 5 is entrained in an air stream that flows downwardly through the screen, and the apertures in the screen 8 are of such size that the desired material can be drawn through the screen by the downwardly flowing air stream while the undesired material remains above it.

In addition to the screen conveyor 8 and the rollers 9, the separating apparatus comprises housing structure having a pair of upright, parallel side walls 12, one adjacent to each side edge of the horizontal screen stretch 10, and each extending a substantial distance above and below that stretch. Preferably each of the side walls 12 has a narrow gap or horizontally extending slot 112 downwardly adjacent to the screen stretch 10, through which air is drawn into the housing structure in a stream that deflects material away from the housing wall 12 and the edge of the screen and towards the center of the screen stretch 10. Inside the housing structure there are a number of chambers defined by various walls and baffles (described hereinafter), all of which extend transversely to the side walls 12, from one to the other of them.

Below the screen stretch 10 there are front and rear transverse walls 14 and 15, respectively, which cooperate with the side walls 12 to define an open-topped collecting chamber 16 into which the desired fluff material issues upon passing through the screen. The open top of the collecting chamber 16 thus comprises an inlet to that chamber, and the screen stretch 10 extends completely across that inlet.

The housing structure above the screen stretch 10 defines a downwardly and rearwardly inclined duct or passage 17 that has the inlet 5 in its upper portion and opens downwardly at its bottom to the rear portion of the screen stretch 10 and thus, through the screen, into the collecting chamber 16.

The upper portion of the duct 17 is essentially a feed passage along which mixed material from the shredder 6 flows downwardly towards the screen, entrained in a downward air flow. The lower portion of the duct 17 comprises a separating chamber 18, and as such it constitutes the rearmost of a succession of separating chambers 18, 18', 18", 18'" that extend forwardly along the screen stretch 10, defined from one another by transverse, downwardly and rearwardly inclined baffle walls 19, 19', 19" that are located above the screen.

To generate the above-mentioned downward flow of air through the duct 17 and the screen stretch 10, the inlet 5 of the separation apparatus is communicated with the atmosphere, and a subatmospheric pressure is maintained in the collecting chamber 16, as by means of a pump or exhaust blower 20 connected at an outlet from it.

The duct or passage 17 is defined by the upright side walls 12, a downwardly and rearwardly inclined rear housing wall 21 that has its lower edge closely adjacent to the screen and rearwardly adjacent to the rear edge of the inlet opening in the collecting chamber 16, and a downwardly and rearwardly inclined front passage wall 22, the lower portion of which comprises the rearmost baffle wall 19. The inclination of the rear housing wall 21 is so related to the normal trajectory of material issuing from the shredder 6 that as much of such material as possible encounters the screen stretch 10 near that wall 21, where the incoming screen is clean. The inclination of the passage wall 22 is such as to minimize the amount of screen stretch 10 in the chamber 18 that will normally be clean, to correspondingly reduce the volume of air flow that must be drawn through the screen.

Individual fibres and small clumps of fibres pass through the screen stretch 10 into the collecting chamber 16. The screen is moving in the forward direction rather rapidly (e.g., 1600 fpm), and there is some breakup of clumps and wads of mixed material as a result of impact against the screen stretch 10, but the material has low inertia because of its lightness, so that, for the most part, material that does not immediately pass through the screen tends to adhere to its upper surface under the force of the downwardly flowing air stream. Material that has settled onto the screen must be lifted up off of it by an upward air flow, must be subjected to agitation by which clumps and wads are broken up, and must then be allowed to return to the screen to allow desirable material to pass through it into the collection chamber 16. This process for recovery of a high proportion to the available fluff takes place first in the rear separating chamber 18, and then successively in each of the separating chambers 18', 18", 18'" that are ahead of it along the screen stretch. In each case an upward air flow through the screen is generated in a front portion of the separating chamber, a generally downward flow of air through the screen is maintained in a rear portion of the chamber to drive loose fluff through the screen, and in an intermediate portion of the chamber the material is subjected to agitation while in generally rearward motion above the screen.

To lift material up off of the screen, a plurality of air ducts 23 extend upwardly in the collecting chamber 16, each terminating at an upwardly opening air outlet 24 that is just below the screen stretch 10 and in a zone near the front of a separating chamber 18, 18', 18". Each of the air ducts 23 is communicated with a source of air at a pressure higher than the subatmospheric pressure maintained in the collecting chamber 16. It has been found satisfactory to communicate the inlets of the ducts 23 with atmospheric air, but better results have been obtained by connecting them to the outlet of a low-pressure blower 25 whereby air is forced into said ducts at an above-atmospheric pressure of about 2 to 4 inches of water. Each air duct 23 converges toward its outlet 24 to accelerate the air stream flowing through it, and each outlet 24 is rather narrow as measured in the direction of movement of the screen stretch 10, but it extends substantially entirely across the screen.

Just behind each air outlet 24 there is an air deflector or stream divider 26 which underlies the screen and extends from one to the other of the upright side walls 12. Preferably a similar deflector or stream divider 26' is also located just in front of each air outlet 24, although, in tests, satisfactory results have been obtained without the front deflector 26'. The width of each air deflector 26, 26' as measured in the direction 11 can be about equal to the width of its adjacent air outlet 24, and each can be in the nature of a wall segment, as shown, having a height to ensure reasonably smooth flow of air downwardly along it for a distance from the screen. The air deflectors 26, 26' provide some sliding support for the screen stretch 10, but they have an additional and more important function. By means of each air deflector 26, 26', the upwardly flowing air stream issuing from its adjacent air outlet 24 is to some extent isolated from the downflow of air at the opposite side of the deflector. Those substantially oppositely flowing air streams are thus prevented from cancelling one another, and instead, a vortex tends to form in the space above each deflector 26, 26'.

It will be apparent that any material that is resting on a portion of the screen that passes over an air outlet 24 will be blown up off of the screen by the upward air flow issuing from that outlet. After being so lifted, it will be propelled back along the screen, as will appear from the following.

Figure 2:
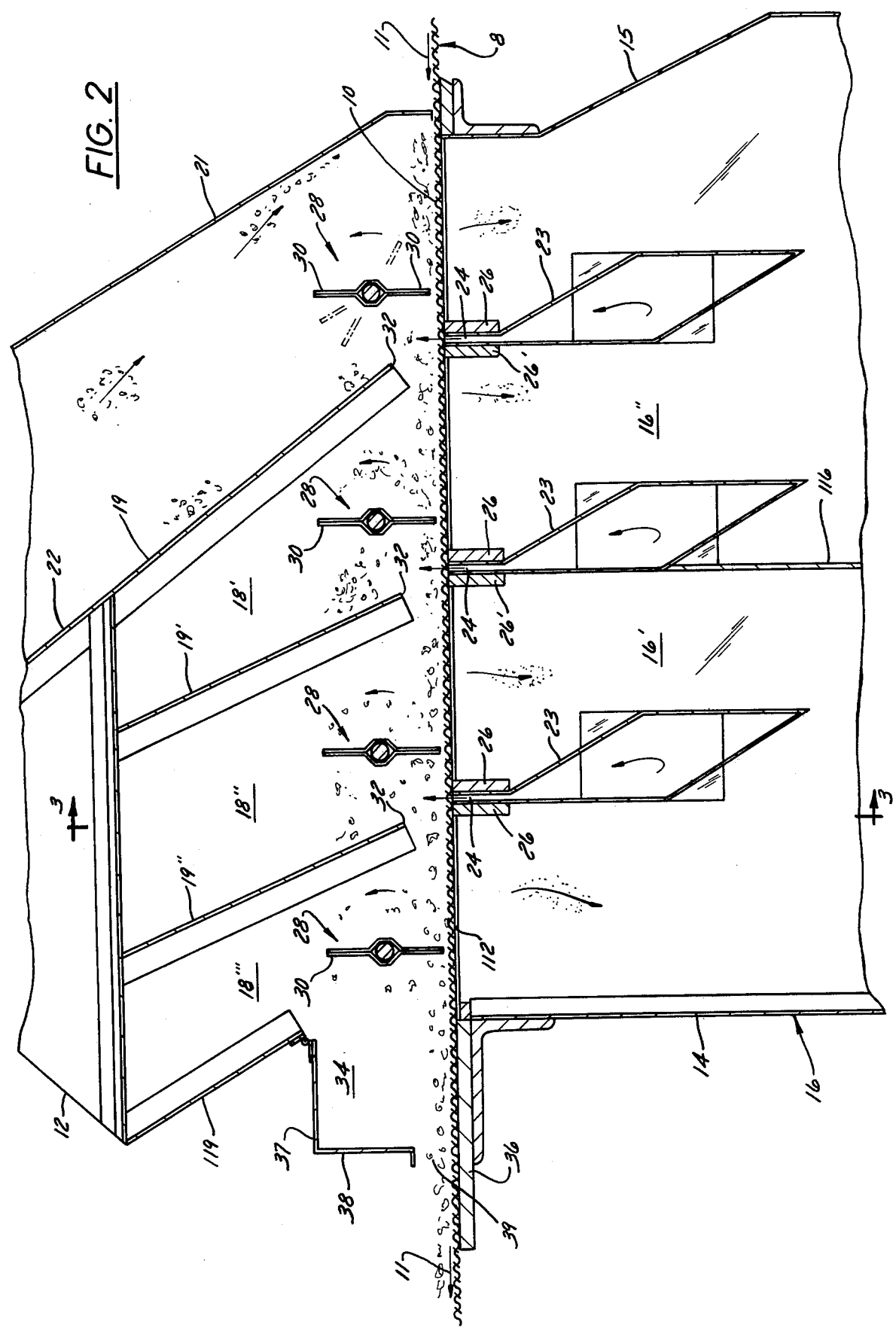
FIG. 2 is a detail view on a larger scale, also in vertical section.
Figure 3:
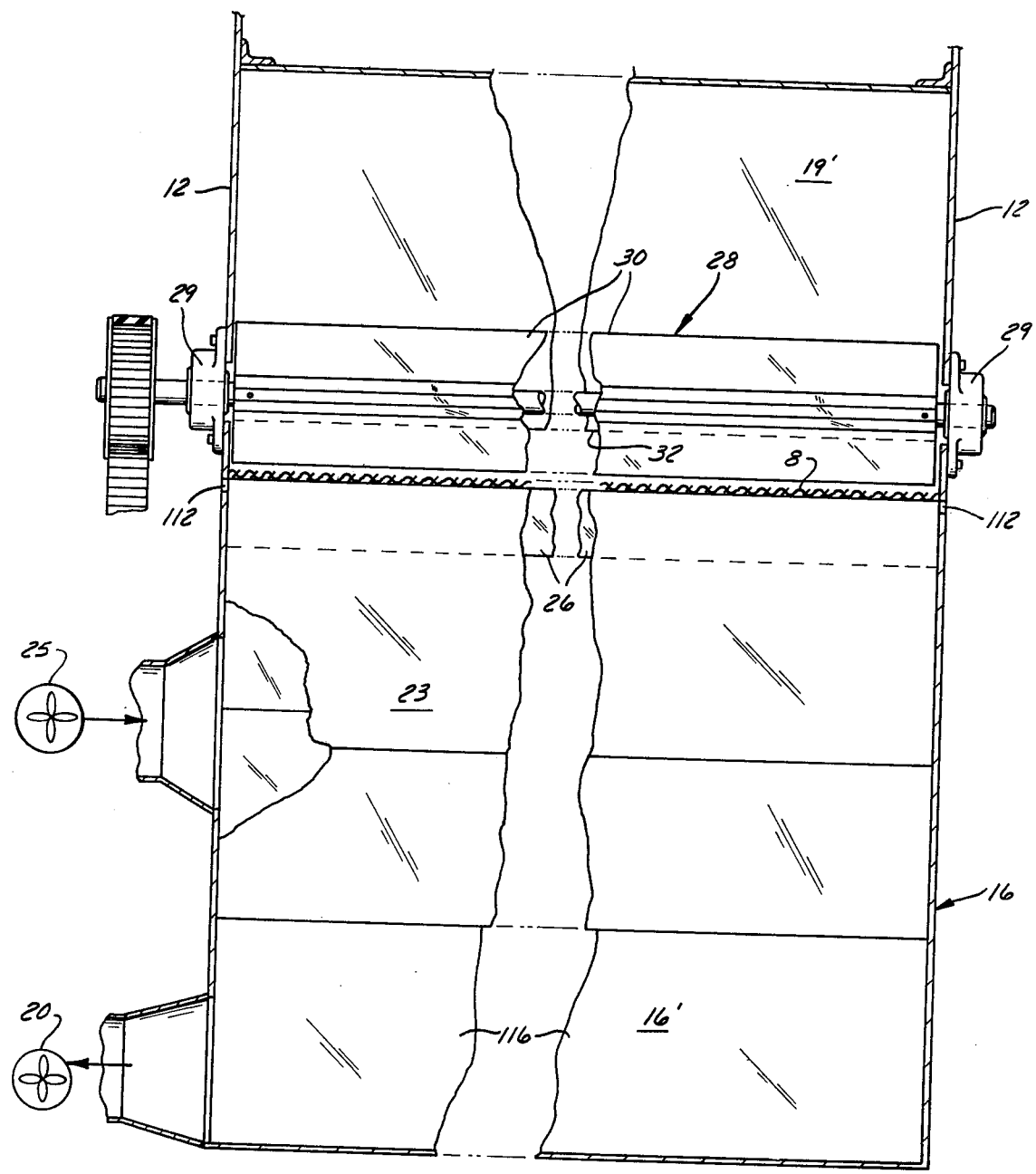
FIG. 3 is a view in horizontal section taken on the plane of the line 3—3 in FIG. 2.

In each separating chamber 18, 18', 18", 18'", near the front of the chamber and at a level just above the screen stretch 10, there is a paddle wheel rotor 28 that cooperates with the air outlet 24 and the air deflector 26 at the front of that chamber. Each rotor 28 extends entirely across its separating chamber, being journalled in bearings 29 that are supported on the side walls 12 of the housing structure. Its flat, radially extending blades 30—of which each rotor preferably has two—extend axially along its full length, and each rotor is so located in its separating chamber that the tips of its blades, at the bottoms of their orbits, pass close to the screen stretch 10 at a zone spaced a short distance behind its adjacent air deflector 26. Each rotor is driven for rotation in a direction (counterclockwise as seen in FIGS. 1 and 2) such that its blades sweep rearwardly relatively to the screen stretch 10 in the lower parts of their orbits.

In cooperation with the air outlet 24 and the air deflector 26 for its separating chamber, each rotor 28 produces a marked turbulence in the front lower portion of its separating chamber whereby material lifted up off of the screen by an upward flow from an air outlet 24 is propelled rearwardly while being subjected to tumbling agitation. In this manner the wads and clumps of mixed scraps and fluff are broken up to free the fluff to be drawn through the apertures in the screen, while the scraps of undesired material tend to be prevented from settling on the screen and blocking its apertures, although ultimately, of course, the undesired material is carried out of the housing by the screen. The forces acting upon the lifted material include both turbulent air flow and direct impact by the rotor blades 30, the latter being mainly responsible for breaking up clumps and wads.

For each separating chamber, the combined effect of its air outlet 24 and its rotor 28 can thus be regarded as a scrubbing action upon the portion of the screen stretch which is passing through that chamber, combined with an agitating circulation of material within the chamber as material is propelled back towards the rear of the chamber at the same time that the screen is tending to carry material to and through the front portion of the chamber.

The baffle walls 19, 19', 19'' which separate adjacent separating chambers from one another are preferably inclined downwardly and rearwardly, like the duct 17, so that any material which might be thrown up against the front baffle wall of a separating chamber—as by the rotor 28 for that chamber—will likewise be given a rearward component of motion as it slides down that baffle. Note that the lower edge 32 of each baffle wall is spaced above the screen stretch 10 by a distance sufficient for material on the screen to pass under the baffle wall. Furthermore, the lower edge 32 of each baffle wall is forwardly adjacent to the sweep of a rotor 28 and is further so located that material sliding down the baffle wall tends to fall into an upflow of air issuing from an air outlet 24.

It will be apparent that the apparatus functions in such a manner that material which has not passed into the collecting chamber 16 tends to be retained in the separating chamber in which it finds itself, undergoing a more or less agitated circulation in that chamber. The amount of material that is circulating in a separating chamber tends to diminish more or less steadily as fluff passes into the collecting chamber 16, but normally new material is fed into the machine at a more or less steady rate. Thus, in the case of the rear separating chamber 19, for example, it can be expected that the rate of infeed of new material will exceed the rate at which fluff can discharge into the collecting chamber 16. Eventually the separating chamber will be overloaded and the air outlet 24 and rotor 28 for the chamber will not be able to effect recirculation of all of the material that settles onto the screen. This occurs when the mass of material in the chamber is so great that energy available for keeping the material in the chamber is insufficient to prevent some of the material from settling onto the screen and thus being carried out of the chamber. The screen will then carry into the next forward separating chamber such accumulations of materials as constitute the excess load, and the circulating content of each chamber will thus be automatically limited to some maximum quantity which represents the separating capacity of that chamber. The factors that determine the capacity of a chamber include the size of the gap 32 between the screen stretch 10 and the front baffle wall 19 of the chamber, the rate of downward air flow into the collecting chamber 16, the distance between the screen stretch 10 and the bottom of the orbit of the paddle wheel blades 30, and the rate of upward air flow from the outlet 24 for the chamber.

As overflow is carried from an overloaded separating chamber into the next forward separating chamber, a process occurs there that is substantially identical to what is taking place in the overloaded chamber. Until a chamber is overloaded, there is substantially no forward flow of material out of it. With a rapid input of materials there will be an overflow from the second to a third separating chamber, from a third to a fourth, and so on, through as many such chambers as may be present.

The number of separating chambers to be provided in a machine of this invention should be related to the expected rate of infeed, the mesh of the screen, the economically optimum proportion of fluff to be recovered, and the proportions of desired and undesired materials in the mix fed into the machine.

With a screen of any given mesh, the proportion of desired material that will be reclaimed from a given amount of mixed material will depend upon the number of separating chambers in the machine. Each successive separating chamber achieves recovery of a certain percentage of the available fluff in the mixture overflowing into it from the preceding one, and that percentage is fairly constant from chamber to chamber. However, since each successive separating chamber recovers a smaller absolute quantity of fluff than the one ahead of it, there is a limit to the number of such chambers that will ordinarily be advantageous. The point of uneconomically diminishing returns seems to lie at four or five chambers for average cases but could be as high as thirty with a shredder 6 of high capacity.

Other things being equal, a higher expectable infeed rate and/or a finer mesh screen requires an increase in the number of separating chambers.

The mesh size of the screen—i.e., the size of its apertures—influences the quality of the desired material reclaimed by means of the apparatus. With a relatively coarse mesh screen, a small percentage of the finer scrap particles will be present in the reclaimed material, and for many purposes such an output will be satisfactory inasmuch as it will be obtainable at low processing cost and will compare favorably with the mixture of virgin fluff and reclaimed material that has heretofore been used in disposable diapers. With a finer-mesh screen and a correspondingly larger number of separating chambers, the reclaimed fluff can actually be of substantially higher quality than virgin fluff, inasmuch as it will include none of the nits or fisheyes—clotted wads of imperfectly fibrized material—that are always present to some extent in virgin fluff. Thus, if desired, a machine of this invention could be employed for processing virgin fluff to improve its quality by removing the nits from it.

Because the individual fibres of fluff are very slender and supple, and have a tendency to cling to one another and to other objects, the screen 8 should be of such character as to discourage adhesion of fluff particles to it. In particular, it has been found that if the screen is a network of interwoven mutually transverse filaments, all junctions of intersecting filaments should be sealed to prevent fluff fibres from being caught between filaments and starting build-ups.

Except for the rearmost separating chamber 18, every separating chamber 18', 18'', . . . is closed at its top so that air can enter it only from adjacent separating chambers and from its downwardly adjacent upflow air outlet 24. This limits the amount of air that must be exhausted from the collecting chamber 16 in order to maintain an adequate partial vacuum therein.

The front separating chamber 18''' has a rotor 28 like the others but has no upflow air outlet 24. Instead, its front or outlet portion comprises a settling bay 34 wherein the tailings from the separating process can settle down onto the screen to be carried out of the housing thereon and sucked off of the screen at a vacuum inlet 35 that is spaced forwardly from the front of the housing. The settling bay 34 is forward of both the front rotor 28 and the front wall 14 of the collecting chamber 16. Flatwise underlying the portion of the screen that extends through the settling bay 34 is a self-life air deflector 36 that prevents upward flow of air through the screen and into the settling bay. Note that the front wall 119 of the front separating chamber 18''', which is downwardly and rearwardly inclined like the baffle walls 19, 19', 19'' behind it, has its lower edge at a substantial distance above the screen, to provide an unrestricted inlet to the settling bay 34. The walls of the settling bay comprise a horizontal top wall 37 that projects forwardly from the bottom edge of the inclined wall 119 and a lower front wall 38 that projects downwardly from said top wall 37.

The bottom edge of the lower front wall 38 is spaced above the screen to provide an exit 39 through which tailings can be carried out of the housing structure on the screen. Because the main part of the front separating chamber is communicated with the collecting chamber 16 through the screen, there is a sub-atmospheric pressure in the settling bay 34 that induces an inflow of air through the exit 39 whereby wads and clumps of material on the screen are blown back towards engagement with the front rotor 28, but such airflow will have little effect upon scraps of undesired material that lie more or less flatly on the screen, provided that air is not drawn downwardly into the collecting chamber 16 at an excessive rate. If a high rate of airflow into the collecting chamber 16 is to be used, a seal roll (not shown) such as is conventional in machines for forming pads from fluff fibres, can be located at the outlet from the housing.

As indicated at 116, there can be vertical partitioning in the collecting chamber 16 to divide it into two or more subchambers. In the illustrated embodiment, for example, one such subchamber 16' is under the two front separating chambers 18''' and 18'' while the other subchamber 16'' is under the two rear separating chambers 18' and 18. Drawing air down into the front subchamber at a lesser rate than into the rear one tends to reduce the inflow of air through the exit 39 as well as promoting a desirable generally rearward flow of air along the screen stretch 10.

The recovered fluff that passes into the collecting chamber 16 can be removed from that chamber in any suitable manner. It will be apparent that the collecting chamber 16 could comprise the inlet to a pad forming machine (not shown) of generally conventional type, whereby reclaimed fluff is started on its way towards remanufacture into new absorbent articles.

From the foregoing description taken with the accompanying drawings, it will be apparent that this invention provides simple and very efficient apparatus whereby the cellulosic fluff filler of disposable diapers and similar absorbent articles can be cleanly separated from scraps of undesired material with which such fluff is mixed when rejected articles are shredded for reclamation, and it will also be evident that the invention provides for recovery of a high proportion of the desirable material and, further, affords such complete and thorough separation that the reclaimed fluff can actually be superior in quality to virgin fluff.

I claim:

1. Apparatus by which fibrous fluffy material such as the filler of disposable diapers can be separated from undesired material such as scraps of sheet material, for recovery of the fluffy material, said apparatus being characterized by:
    A. wall means defining a separating chamber into which mixed fluffy and undesired materials can be fed, said separating chamber having front and rear portions and being open at its bottom;
    B. a conveyor screen
        (1) having apertures through which said fluffy material can pass but which resist passage of said undesired material and
        (2) having a substantially horizontal stretch which extends across the open bottom of said separating chamber and which moves edgewise forwardly;
    C. wall means defining a collecting chamber beneath said stretch of the screen that opens upwardly through said stretch to the rear portion of said separating chamber;
    D. means for causing air to flow downwardly through said screen from the separating chamber into the collecting chamber, to drive fluffy material through the screen;
    E. air discharge means communicated with a source of air at a pressure above that in said separating chamber and defining an air outlet which is downwardly adjacent to said stretch of the screen and opens upwardly therethrough to the front portion of the separating chamber, for producing an upward flow of air through said stretch of the screen whereby material thereon near the front of the separating chamber is lifted off of the screen; and
    F. acceleration means near the front of the separating chamber for imparting rearward motion to material lifted off of said stretch of the screen by said upward flow of air.

2. The apparatus of claim 1 further characterized by: said separating chamber comprising a lower portion of a duct that has its upper portion communicated with a source of mixed fluffy and undesired materials, said duct having front and rear walls which are at a downward and rearward inclination relative to said stretch of the screen so that said mixed materials arrive at a portion of the screen that is entering said separating chamber and onto which material has not yet settled.

3. The apparatus of claim 1, further characterized by: said acceleration means comprising an agitating rotor in the front portion of said separating chamber.

4. The apparatus of claim 3, further characterized by: said agitating rotor
    (1) being rotatable about a horizontal axis which extends transversely to the direction of movement of said stretch of the screen,
    (2) having vanes which are swept flatwise by its rotation, through orbits which have their bottom portions near said stretch of the screen and rearwardly adjacent to said air outlet, and
    (3) being rotated in a direction such that said vanes move rearwardly relative to said stretch of the screen in said bottom portions of their orbits.

5. The apparatus of claim 1, further characterized by: said means for causing air to flow downwardly through said screen comprising suction means communicated with said collecting chamber to maintain subatmospheric pressure therein.

6. The apparatus of claim 5, further characterized by: said air discharge means being communicated with a source of air at above-atmospheric pressure.

7. A method whereby fluffy, fibrous desired material such as the filler of disposable diapers is separated from undesired material with the use of a screen having a horizontal stretch and having apertures through which only said desired material can pass, said method being characterized by:
- A. moving said stretch of the screen substantially horizontally in a forward direction,
- B. producing at a first zone of said stretch of the screen an air pressure difference vertically across the screen that induces a downwardly flowing airstream therethrough;
- C. feeding mixed desired and undesired material towards said first zone from above said stretch to enable desired material to be driven through the screen by said downwardly flowing air stream;
- D. directing an upward flow of air through the screen at a second zone in said stretch that is spaced in said forward direction from said first zone, to thus lift material off of said screen that has been carried out of said first zone thereon; and
- E. propelling the lifted material rearwardly above the screen towards said first zone.

8. The method of claim 7, further characterized by: propelling said lifted material rearwardly by deflecting said upward flow of air rearwardly above the screen.

9. The method of claim 8 wherein said upward flow of air is deflected rearwardly above the screen by imparting to a blade flatwise orbital motion whereby it sweeps in a rearward direction above the screen near said second zone and then upwardly away from the screen in said first zone.

10. The method of claim 7, further characterized by: propelling said lifted material rearwardly by rotating a paddle wheel to drive its vanes flatwise in an orbit wherein they sweep rearwardly near the top surface of said stretch of screen at a front portion of said first zone.

11. The method of claim 7, further characterized by: substantially blocking flow of air through said screen at a third zone in said stretch that is between said first and said second zones.

12. The method of claim 7 further characterized by: feeding said mixed material towards the screen from a level above the same, in a substantially downward flow that has a substantial component of rearward motion.

13. Apparats for separating fluffy desired material comprising short, supple fibres from undesired material, for recovery of the desired material, said apparatus being of the type comprising an endless conveyor screen through which said desired material can pass but which blocks passage of said undesired material, said screen having a straight stretch and being driven for movement of said stretch in a forward direction, means defining a collecting chamber at one side of said stretch having an inlet opening through said stretch, means for delivering mixed desired and undesired material to a zone at the other side of said stretch, and means for forcing air through said stretch, from said zone into said collecting chamber, to cause desired material to pass through the screen into the collecting chamber while the screen retards passage of the undesired material, said apparatus being characterized by:
- A. said stretch of the screen being substantially horizontal;
- B. a rotor above said stretch of the screen, spaced in said forward direction from the rear end of said stretch, said rotor
  - (1) having a substantially horizontal axis extending substantially transversely to said direction and
  - (2) having vanes which are carried substantially flatwise by rotation of the rotor about said axis, through an orbit that has a bottom portion wherein the vanes move rearwardly close to said stretch of the screen; and
- C. means for discharging a stream of air upwardly through said stretch of the screen from an outlet located substantially beneath said rotor.

14. Apparatus whereby fluffy desired material comprising short, supple, fibres is separated from undesired material, for recovery of the desired material, said apparatus being characterized by:
- A. a conveyor screen through which said desired material can pass but which blocks passage of said undesired material, said screen
  - (1) having a substantially horizontal stretch and
  - (2) being driven for movement of said stretch in a forward direction;
- B. means defining a collecting chamber downwardly adjacent to said stretch and having an inlet that opens upwardly through said stretch;
- C. means for maintaining a pressure difference across said stretch of the screen whereby air is caused to flow downwardly therethrough into said inlet;
- D. means for delivering mixed desired and undesired material to a zone above said stretch that is over said inlet, so that desired material can be forced into the collecting chamber by air flowing into said inlet;
- E. recirculation means whereby material that is resting on said stretch forward of said zone is lifted off of the screen and is propelled back towards said zone, said recirculation means comprising
  - (1) air discharge means
    - (a) communicated with a source of air at higher pressure than is maintained in said collecting chamber and
    - (b) defining an upwardly opening air outlet that is downwardly adjacent to said stretch and in forwardly spaced relation to said inlet, from which outlet a stream of air flows upwardly through said stretch of the screen, and
  - (2) a rotor having a substantially horizontal axis that is above said stretch of the screen and having vanes, said rotor being rotatable about its axis to carry said vanes substantially flatwise through an orbit that has a front portion substantially over said air outlet and a bottom portion wherein the vanes move rearwardly close to said stretch of the screen.

* * * * *